(12) United States Patent
Schumann et al.

(10) Patent No.: US 8,362,891 B2
(45) Date of Patent: Jan. 29, 2013

(54) METHOD FOR DISPLAYING THE REMAINING RANGE OF A MOTOR VEHICLE

(75) Inventors: Josef Schumann, Munich (DE); Nicolas Schreiber, Landshut (DE); Marc Breisinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 444 days.

(21) Appl. No.: 12/713,760

(22) Filed: Feb. 26, 2010

(65) Prior Publication Data

US 2010/0219945 A1 Sep. 2, 2010

(30) Foreign Application Priority Data

Feb. 28, 2009 (DE) .......................... 10 2009 011 015

(51) Int. Cl.
*B60Q 1/00* (2006.01)
*B60Q 1/50* (2006.01)
*B60L 9/00* (2006.01)
*B60K 6/20* (2007.10)
*B60K 1/00* (2006.01)

(52) U.S. Cl. ........ 340/438; 340/439; 340/464; 340/456; 340/441; 340/461; 340/425.5; 340/457; 340/459; 903/903; 701/22; 180/65.21; 180/65.31; 180/65.51

(58) Field of Classification Search .................. 340/438, 340/439, 464, 456, 441, 461, 425.5, 457, 340/459; 903/903; 701/22; 180/65.21, 65.31, 180/65.51

See application file for complete search history.

(56) References Cited

U.S. PATENT DOCUMENTS

| | | | | | |
|---|---|---|---|---|---|
| 4,862,395 | A | * | 8/1989 | Fey et al. ...................... | 702/146 |
| 5,309,139 | A | * | 5/1994 | Austin .......................... | 340/462 |
| 5,422,625 | A | * | 6/1995 | Sakaemura .................... | 340/461 |
| 5,459,666 | A | * | 10/1995 | Casper et al. ................. | 701/123 |
| 5,686,895 | A | * | 11/1997 | Nakai et al. ................. | 340/636.1 |
| 5,880,710 | A | * | 3/1999 | Jaberi et al. .................. | 345/618 |
| 5,916,298 | A | * | 6/1999 | Kroiss et al. ................. | 701/123 |

(Continued)

FOREIGN PATENT DOCUMENTS

| | | |
|---|---|---|
| DE | 35 44 427 A1 | 6/1987 |
| DE | 197 41 316 A1 | 3/1999 |

(Continued)

OTHER PUBLICATIONS

German Search Report dated May 6, 2009 with English translation (nine (9) pages).

*Primary Examiner* — Daniel Wu
*Assistant Examiner* — Kam Ma
(74) *Attorney, Agent, or Firm* — Crowell & Moring LLP

(57) ABSTRACT

A method displays the remaining range of a motor vehicle. The method determines repeatedly estimated values relating to the remaining range of the motor vehicle based on a fill level of an energy storage unit and at least one additional motor-vehicle state influencing the remaining range. A first remaining-range value is determined based on the estimated values and displayed as a first display value by a first graphical element on the display device. An updated second remaining-range value is determined during the display of the first display value. If the difference, in terms of amount, between the first and the second remaining-range values exceeds a predetermined threshold value, the second remaining-range value is displayed as a second display value by a second graphical element in addition to the first display value on the display device.

18 Claims, 3 Drawing Sheets

U.S. PATENT DOCUMENTS

| | | | | |
|---|---|---|---|---|
| 6,140,917 | A * | 10/2000 | Branson | 340/461 |
| 6,412,187 | B1 * | 7/2002 | Sasaki et al. | 33/784 |
| 6,480,106 | B1 * | 11/2002 | Crombez et al. | 340/461 |
| 6,600,413 | B1 * | 7/2003 | Lo | 340/439 |
| 6,625,562 | B2 * | 9/2003 | Hayashi et al. | 702/145 |
| 6,748,319 | B2 * | 6/2004 | Aoki et al. | 701/527 |
| 6,781,512 | B2 * | 8/2004 | Hayashi et al. | 340/456 |
| 6,794,853 | B2 * | 9/2004 | Kondo | 320/132 |
| 6,844,811 | B2 * | 1/2005 | Hayashi et al. | 340/441 |
| 7,073,125 | B1 * | 7/2006 | Nystrom et al. | 715/703 |
| 7,079,018 | B2 * | 7/2006 | Hottebart et al. | 340/442 |
| 7,237,203 | B1 | 6/2007 | Kuenzner | |
| 7,262,689 | B2 * | 8/2007 | Kolpasky | 340/461 |
| D563,977 | S * | 3/2008 | Carl et al. | D14/488 |
| 7,675,404 | B2 * | 3/2010 | Kanzaka | 340/441 |
| 7,726,255 | B2 * | 6/2010 | Nakamichi | 116/62.4 |
| 7,898,405 | B2 * | 3/2011 | Burke et al. | 340/461 |
| 7,925,413 | B2 * | 4/2011 | Isaji et al. | 701/93 |
| 8,055,419 | B2 * | 11/2011 | Meng | 701/64 |
| 8,082,774 | B2 * | 12/2011 | Watson et al. | 73/114.54 |
| 2002/0154003 | A1 * | 10/2002 | Ueda | 340/425.5 |
| 2004/0093129 | A1 * | 5/2004 | Majstorovic et al. | 701/1 |
| 2005/0174226 | A1 * | 8/2005 | Heyden et al. | 340/461 |
| 2007/0208468 | A1 * | 9/2007 | Sankaran et al. | 701/29 |
| 2008/0258892 | A1 * | 10/2008 | Itoh et al. | 340/441 |
| 2010/0102945 | A1 * | 4/2010 | Watson et al. | 340/462 |
| 2011/0205044 | A1 * | 8/2011 | Enomoto et al. | 340/439 |

FOREIGN PATENT DOCUMENTS

| | | |
|---|---|---|
| DE | 199 02 949 A1 | 8/2000 |
| DE | 199 59 597 C1 | 2/2001 |
| DE | 103 41 846 A1 | 3/2005 |
| DE | 603 08 499 T2 | 9/2007 |

* cited by examiner

METHOD FOR DISPLAYING THE REMAINING RANGE OF A MOTOR VEHICLE

CROSS-REFERENCE TO RELATED APPLICATIONS

This application claims priority under 35 U.S.C. §119 from German Patent Application No. DE 10 2009 011 015.1, filed Feb. 28, 2009, the entire disclosure of which is herein expressly incorporated by reference.

BACKGROUND AND SUMMARY OF THE INVENTION

The present invention relates to a method for displaying the remaining range of a motor vehicle with the aid of an information device of the motor vehicle. The information device includes a device for determining the fill level of an energy storage unit of the motor vehicle, a computer unit for determining estimated values relating to the remaining range and a graphical display device for displaying the remaining range.

Many such methods have been disclosed in the prior art. The disadvantage of known methods used for displaying the remaining range is the fact that the driver of the motor vehicle or the observer of the display is provided with very little assistance on the relationship between the remaining range displayed and his driving behavior.

It is therefore the object of the present invention to provide a simple method which improves the delivery of information to the driver.

This object is achieved by a method for displaying the remaining range of a motor vehicle with the aid of an information device of the motor vehicle including a device for determining the fill level of an energy storage unit of the motor vehicle, a computer unit for determining estimated values relating to the remaining range and a graphical display device for displaying the remaining range. The method includes the following steps: (i) estimated values relating to the remaining range of the motor vehicle are repeatedly determined based on the fill level of the energy storage unit and at least one additional motor-vehicle state influencing the remaining range, (ii) a first remaining-range value is determined based on the estimated values and displayed as a first display value by a first graphical element on the display device, (iii) an updated second remaining-range value is determined during the display of the first display value, and (iv) if the difference, in terms of amount, between the first and the second remaining-range values exceeds a predetermined threshold value, the second remaining-range value is displayed as a second display value by a second graphical element in addition to the first display value on the display device. Advantageous embodiments and improvements of the invention are described herein.

According to the invention, estimated values relating to the remaining range of the motor vehicle are repeatedly determined based on the fill level of the energy storage unit and at least one additional motor-vehicle state influencing the remaining range, such as the accelerator position and/or the activation of additional consumers, particularly the climate setting. A first remaining-range value is determined based on these estimated values and displayed as a first display value by a first graphical element on the display device. The first display value is preferably displayed substantially statically; that is to say, it remains constant at least for periods of time spanning several seconds except during changes in the overall display described below and is thus easily readable by the driver (or any other observer). During this indication of the first display value, an updated second remaining-range value is determined, and the difference between the first and the second remaining-range values is determined. If this difference, in terms of amount, exceeds a predetermined threshold value, the second remaining-range value is displayed as a second display value by a second graphical element in addition to the first display value on the display device.

Thus, if an updated remaining-range value for the motor vehicle is present, this updated remaining-range value is not displayed immediately in place of the remaining-range value that was previously displayed and is obsolete to a certain extent. Rather, the previously displayed remaining-range value continues to be displayed, at least initially. In the presence of the second remaining-range value; that is to say, delayed in time in relation to the display of the first display value, and only when the second remaining-range value clearly differs from the first remaining-range value, the second remaining-range value is displayed in addition to the first remaining-range value. An unstable overall display is thus avoided. With the help of the second display value, the driver can observe the remaining range resulting from his most recent operating and driving behavior. With the help of the first display value, which continues to be displayed, he can also have, at a glance, the outcome of the last prognosis of the remaining range.

The invention provides a simple method, by which the driver of the motor vehicle is provided with assistance in observing the effects of his driving style and/or other influencing variables on the remaining range of the motor vehicle.

If the difference between the first and the second remaining-range value is small; that is to say, if the predetermined threshold value is fallen short of, in terms of amount, the second remaining-range value can simply be accepted as the first display value and displayed with the aid of the first graphical element instead of fading in the second graphical element. The display technique in this embodiment thus corresponds to conventional processes for displaying the remaining range of a motor vehicle as long as the predetermined threshold value is fallen short of, in terms of amount.

Accordingly, an improved visualization of a reducing remaining range, in which visualization the second display value is smaller than the first, is provided. The display of the second graphical element can optionally be confined to such cases.

A second remaining-range value is preferably determined at regular time intervals; that is to say, cyclically, and its difference from the actual first display value is determined, and an examination is carried out to determine whether this difference is large enough to necessitate a second graphical element to visualize it.

The time interval between the most recent update of the first display value and the first graphical element and a possible fade-in of a second graphical element can be freely dimensioned, in principle. A short time interval results in a more frequent update of the overall display, a longer time interval results in a more stable image and easier readability. A time interval of a few seconds appears advantageous.

In a very simple case of implementing the invention, a remaining-range value is determined every "n" seconds by way of example (where "n" can be equal to 1, 3, 5, or 10). In the case of only small deviations or no deviation from the last determined value, the newly determined value is immediately accepted as the first display value, the first graphical element is changed accordingly, if appropriate, and the second graphical element is not faded in. In the case of a larger deviation, the first display value and the first graphical element remain unchanged, and a second graphical element is faded in so that the newly determined value can be displayed as the second display value.

The above example illustrates a substantially time-controlled sequence. The determination of the second remaining-range value, the determination of the difference from the first remaining-range value, the examination of the magnitude of difference and/or the possible visualization by means of a second graphical element can also be effected as function of the event; for example, if a distinct change in the consumption behavior or a change in an operating mode of the motor vehicle has been detected.

According to a preferred embodiment of the invention, the estimated values are determined cyclically at substantially fixed time intervals.

In particular, the first remaining-range value can be equal to a first estimated value and the second remaining-range value is equal to a second estimated value, which follows the first estimated value in the order of determination. The method described can thus be implemented with particular efficiency. The computer-intensive estimation of the remaining range need not be carried out any more frequently than the updating of the overall display.

However, if the estimation of the remaining range is to be updated more frequently than the overall display, the second remaining-range value can be determined as a statistical measure, particularly an average value or a weighted average, of the estimated values determined within a progressive time window. In particular, the time window can be selected such that its length corresponds to the time following which the overall display of the display device is to be updated regularly.

A method according to a first advantageous improvement of the invention additionally includes the following steps. During the display of the first and the second display value, an updated third remaining-range value is determined. If this third remaining-range value is closer to the second remaining-range value than to the first remaining-range value, the second remaining-range value is accepted as the first display value and displayed by the first graphical element. However, the second graphical element in this first improvement of the invention remains faded in in order to continue to qualitatively indicate the reduction of the remaining range in relation to the initial state (first remaining-range value). This can be advantageous, for example, if the reduction of the remaining range from the first to the second remaining-range value is a result of the driver's driving behavior that does not correspond to an actually selected operating mode of the motor vehicle (e.g., if an ECO-mode is "overruled" by strongly pressing down the accelerator pedal).

A method according to another advantageous improvement of the invention includes the following steps. During the display of the first and the second display value, an updated third remaining-range value is determined. If this third remaining-range value is closer to the second remaining-range value than to the first remaining-range value, the second remaining-range value is accepted as the first display value and displayed by the first graphical element, and the second graphical element is faded out.

This improvement of the invention is relevant when a change in the estimated values of the remaining range has previously led to the fade-in of a second graphical element.

By means of this improvement of the invention, the overall display is again reduced after a temporary simultaneous display of two display values to the display of a single display value. The display thus becomes clearer for the observer. This improvement is based on the finding that only those changes in the remaining range that directly date back in time are of interest to most drivers.

The overall display becomes more comprehensible and easily traceable for the driver or observer by virtue of the fact that the second (and not the third) remaining-range value is accepted. This improvement of the invention can be implemented and/or modified in different ways, to advantage.

If, for example, the third remaining-range value is closer to the first remaining-range value than to the second remaining-range value, the second display element can simply be faded out again. The driver has then apparently again largely corrected his driving style and his consumption settings in such a way, after the temporary change resulting in the fading-in of the second graphical element, that the original prediction of the remaining range displayed by the first graphical element is again valid. One of the unique advantages of the invention becomes apparent from this embodiment: The driver was informed by the fade-in of the second graphical element that the remaining range would reduce if he continued to retain a consumption increase that had occurred in the meantime. However, since the consumption increase was actually only transitory in nature, it is advantageous that the original prediction of the remaining range displayed by the first graphical element never disappeared from the overall display.

According to a modification of the improvement of the invention described above, the following steps can be included in the method. During the display of the first and the second display value, an updated third remaining-range value is determined. If this third remaining-range value is closer to the second remaining-range value than to the first remaining-range value, the third remaining-range value is accepted as the first display value and displayed by the first graphical element, and the second graphical element is faded out.

By virtue of the fact that the third (and not the second) remaining-range value is accepted, the display becomes more updated following the fade-out of the second graphical element. The change in the overall display resulting anyway from the fade-out of the second graphical element is thus used as an opportunity to immediately display an updated remaining-range value.

The time interval between the fade-in of the second graphical element and its fade-out can be freely dimensioned, in principle. A short time interval results in a more frequent update of the overall display, a longer time interval results in a more stable image and easier readability. A time interval of a few seconds appears advantageous. It also appears to be advantageous to select the same time interval here as the one required for updating the first display value or the same time interval as the one required for examining whether a second display value must be displayed by fading in a second graphical element starting from the display of a single display value.

The third remaining-range value can also be determined and/or the second graphical element can be faded out optionally as a function of the event, e.g., if a stabilization of the consumption behavior is detected following a change in the consumption behavior of the motor vehicle, which change had led to the fade-in.

If the estimated values, on which the remaining-range values are based, are determined cyclically at substantially fixed time intervals, the third remaining-range value is preferably equal to a third estimated value following the second estimated value in the order of determination. The method described can thus be implemented with particular efficiency. The period of time taken for fading in the second graphical element into the overall display then substantially corresponds to the duration of the cycle in which the estimated values are determined.

Alternately, the third remaining-range value can be determined as a statistical measure, particularly an average value or a weighted average of the estimated values determined within a predetermined time window. In particular, the time window can be selected to be one in which the second graphical element is faded in.

The first graphical element can be formed as a bar, in particular. The bar can be straight; in particular, it can extend vertically or horizontally or it can be curved. It can be substantially curved in the border region of a circular dial and cling to a border of the circular dial either directly or at a distance therefrom. Such a circular dial can be present physically or it can be represented purely graphically on a display unit of an instrument panel of the motor vehicle.

The first display value can be indicated with the aid of a bar extended along a scale. Optionally, it can be supported by a numerical display. The second graphical element can be formed as an arrowhead, in particular. The arrowhead can have a color other than that of the bar discussed above.

The second display value can be indicated with the aid of the arrowhead by arranging the latter on the same scale along which the bar for indicating the first display value extends. Optionally, it can also be supported by a numerical display. It is noteworthy that the arrowhead in the method described above and in such a display is not arranged at the end of the bar. If the second display value is smaller than the first, for example, the arrowhead is arranged below the tip of the bar, in the case of a bar extending vertically upward. For intensifying the display effect resulting from the process described above, the arrowhead can point away from the end of the bar and toward smaller scale values.

If the second display value is larger than the first display value, the arrowhead is arranged "outside" of the bar. For intensifying the display effect resulting therefrom, the arrowhead can point away from the end of the bar and toward larger scale values. However, the main intention of the invention is the improved visualization of a reducing remaining range, in which visualization the second display value is smaller than the first.

A method according to another advantageous improvement of the invention additionally includes the following steps. During the display of the first display value and before the display of the second display value, a change of the at least one additional motor-vehicle state influencing the remaining range is monitored. If a remaining-range change, in terms of amount, resulting from the change of this motor-vehicle state exceeds a predetermined change threshold value, a third graphical element is displayed for displaying the change, in addition to the first display value.

Starting from the display of a single display value by the first graphical element alone, this third graphical element can be faded in earlier than the possible display of the second display value by means of a fade-in of the second graphical element. By fading in the third graphical element in addition to the first graphical element, the driver can thus be provided even earlier with feedback on the consequences of his driving behavior or consumption behavior.

It should be clarified at this point that the expressions "first graphical element," "second graphical element" and "third graphical element" neither have any chronological significance nor do they have any significance relating to the total number of faded-in graphical elements. The above remarks firstly point out the possibility of a situation in which the third graphical element appears earlier than the second. Secondly, situations can arise in which a total of two graphical elements are faded in, one of which is referred to as the "third graphical element."

The at least one additional motor-vehicle state, such as the consumption behavior, influencing the remaining range is preferably monitored continuously or cyclically.

The time interval between the detection of a change in the consumption behavior and its display by a third display element can be freely dimensioned, in principle, just as the change threshold value that must be exceeded for a display. A short time interval and a low threshold result in a more frequent update of the overall display; a longer time interval and/or a higher threshold result in a more stable image and easier readability. The shortest possible time interval and a threshold of, for example, 10 percent of the current total consumption appear to be advantageous.

Preferably, the display of the change by means of the third graphical element exclusively includes the qualitative display of a decrease or an increase of the remaining range. In order to enable such a qualitative display, the change in the consumption behavior must also be detected only qualitatively. No new estimated value of the remaining range is necessary for this purpose. The display can be based directly on the observation of the consumption behavior and thus can be carried out very promptly.

In particular, the third graphical element can be formed as an arrowhead, which is arranged on the end of the bar formed as the first graphical element. In the case of increasing consumption, the arrowhead preferably shows lower scale values; and in the case of reducing consumption, the arrowhead shows higher scale values.

The display of the third graphical element can be particularly accompanied by a color-coding of the first graphical element. For example, if the first graphical element was colored green in order to indicate an economic driving style, the determination of a consumption increase can be displayed by means of a neutral (e.g., gray) or cautionary (e.g., red) color of the first graphical element.

The third graphical element itself can likewise be formed with varying colors, e.g., green for indicating reducing consumption, and red for indicating increasing consumption. The display of the third graphical element can optionally be limited to cases of increasing consumption.

As explained already, a consumption increase can usually be determined more rapidly than the determination of a new remaining-range prediction. The determination of the second remaining-range value and the optionally resulting display of the second graphical element are thus usually delayed in time in relation to the display of the third graphical element. With such dimensioning, it is advantageous if the second graphical element substantially has the same appearance as the third graphical element. For example, in the case of a leaping and consequently prolonged consumption increase, a new graphical element can then be produced in the overall display in the form of the third graphical element promptly after the leap in consumption increase (based on the determination of a consumption increase). As soon as a new prediction of the remaining range is present, the newly produced graphical element "moves" or "jumps" toward the value of the prediction. In the observer's view, the "movement" or the "jump" results from a fade-in of the second graphical element with a substantially simultaneous fade-out of the third graphical element and the substantially similar appearance of the two graphical elements. A continuous movement instead of a fade-out with simultaneous fade-in is likewise possible in the known manner by using graphical display techniques.

The second and/or the third graphical element are preferably only displayed in one of several operating modes of the motor vehicle. Also the process steps optionally resulting in the display of the second and/or the third graphical element can naturally be omitted in the other operating modes.

An operating mode, in which the second and/or the third graphical element are optionally faded in and the process steps required for this purpose are carried out, can be a so-called ECO mode of the motor vehicle.

Another operating mode, in which the second and/or the third graphical element are optionally faded in and the process steps required for this purpose are carried out, can be an operating mode in which the motor vehicle is present when an ECO mode of the motor vehicle is indeed actually activated, but this ECO mode is temporarily overridden particularly by the driver's actions relating directly to the driving task, e.g., by a strong acceleration of the motor vehicle, which is also possible in the ECO mode by pressing down the accelerator pedal beyond a tactile action point.

In one improvement of the invention, in the case of a transition into a defined operating mode, a change in the remaining range of the motor vehicle associated with the mode switching is displayed on the display device by means of a fourth graphical element—strictly speaking, in a period of time, which follows the transition and can be defined as a function of the time and/or event. This fourth graphical element can be formed as an arrowhead. The display of the fourth graphical element can be accompanied by a color change of the first graphical element. With the aid of such design measures, for example, the following image can be achieved. A driver initially operates his motor vehicle in a normal mode or in a sport mode. In such an operating mode, the remaining range of the motor vehicle is displayed in the conventional manner with the aid of a gray bar, for example. The driver now sets his motor vehicle into an ECO mode. The prediction of increased remaining-range resulting from the low consumption to be expected in the ECO mode is visualized by an extension of the bar, by a completely or partially green coloring of the bar (color change) and by an arrowhead (fourth display element) at the end of the bar. Provision is made in one preferred embodiment to color the bar green partially, namely only in the portion protruding beyond the remaining-range prediction that was valid before the conversion of the operating mode. If the driver again leaves the ECO mode, the remaining range is preferably displayed again in the conventional manner.

The operating mode, in which the fourth graphical element is displayed, can be the same as the one in which the second and/or the third graphical element are displayed. However, the fourth graphical element can also be displayed in the case of a transition into a first operating mode (e.g., ECO mode), while the second and/or the third graphical element are only displayed in a second operating mode (e.g., in an ECO-OVERRULE mode; that is to say, if the ECO mode has been temporarily overridden by strong acceleration or any other consumption increase). Particularly, the fourth graphical element can thus be displayed in a transition into an operating mode preceding the one in which the second and/or the third graphical element are displayed, if appropriate.

One advantage of the invention lies in the ability to use the solution suggested by the present invention to seamlessly and elegantly modify many known display techniques for displaying the remaining range of a motor vehicle. It is thus easily possible to confine the display technique of the invention to a defined operating mode of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

It is essentially possible to drive a motor vehicle in two operating modes: a SPORT mode and an ECO mode. Furthermore, a so-called ECO-OVERRULE mode can be achieved starting from the ECO mode by accelerating strongly or strongly pressing down the accelerator pedal of the motor vehicle.

In the SPORT mode, the remaining range of the motor vehicle is substantially displayed in the conventional manner. In the ECO mode and the ECO-OVERRULE mode, the motor vehicle has an enhanced analog display of the remaining range with consumption tendency.

When the operating mode is switched from the SPORT mode to the ECO mode, the analog remaining-range display indicates the consequence of the activation of the ECO mode or the driver's driving behavior in relation to the remaining range.

This display occurs in a sequence of several steps that will be described below according to the order in which they occur in a typical operating cycle.

Step 1 of the cycle: immediately after the SPORT mode is switched over to the ECO mode, the display device indicates the increase in the remaining range achieved by the selection of the ECO mode. The driver can drive particularly efficiently in the ECO mode; however, the performance capability of the motor vehicle is limited and adapted to specific characteristics (maximum speed, torque requirement, movement of the accelerator pedal over a specific accelerator pedal travel, etc.).

The increase in the remaining range resulting from this limitation in comparison to the SPORT mode is predicted when switching over from the SPORT mode to the ECO mode and displayed to the driver in the analog remaining-range display. The difference from the remaining range achieved in the SPORT mode is clearly highlighted in doing so.

Figure 1:
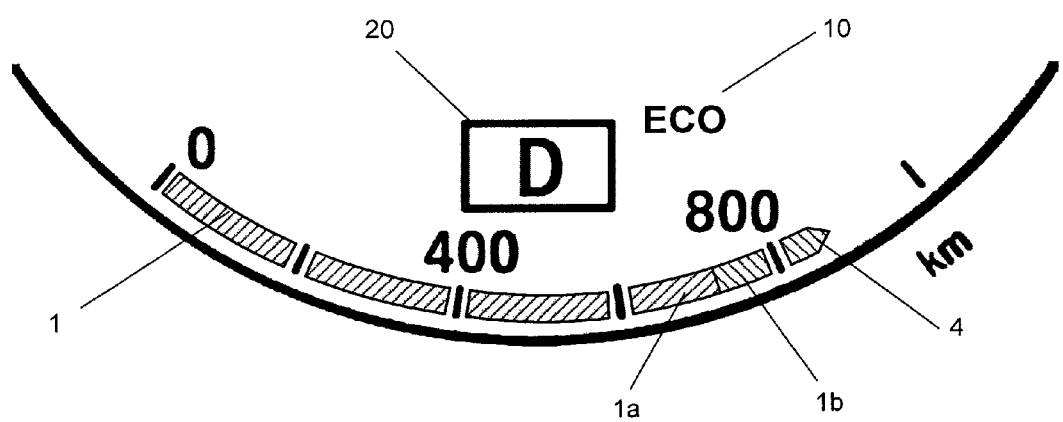
FIG. 1 is a first view of a display device for displaying the remaining range in a motor vehicle.

FIG. 1 shows a view of the display device for displaying the remaining range immediately after switching over to the ECO mode. The bar 1 is composed of a first partial bar 1a and a second partial bar 1b. The bar 1 extends along a scale disposed on the inner edge of a circular dial of the instrument panel of the motor vehicle. The partial bar 1a in the present exemplary embodiment extends from 0 km to approximately 720 km. The partial bar 1b extends from approximately 720 km to approximately 840 km. The partial bar 1b is green in color and provided with an arrowhead 4 at one end. The arrowhead represents a fourth graphical element within the content of the invention. The partial bar 1a can also be of a green color, preferably of a different shade that is less striking than the partial bar 1b. The bar 1 represents a first graphical element within the content of the invention.

The lettering 10 "ECO" indicates to the driver that the vehicle is being operated in the ECO mode. This lettering 10 is illuminated in green in the situation shown in FIG. 1. The gear selection display 20 "D" indicates to the driver that the forward gear has been engaged.

The motor vehicle is operated in the ECO mode until the driver selects another operating mode (e.g., the SPORT mode) or leaves this operating mode temporarily by consciously activating the accelerator pedal in order to switch over to the ECO-OVERRULE mode.

Figure 2:
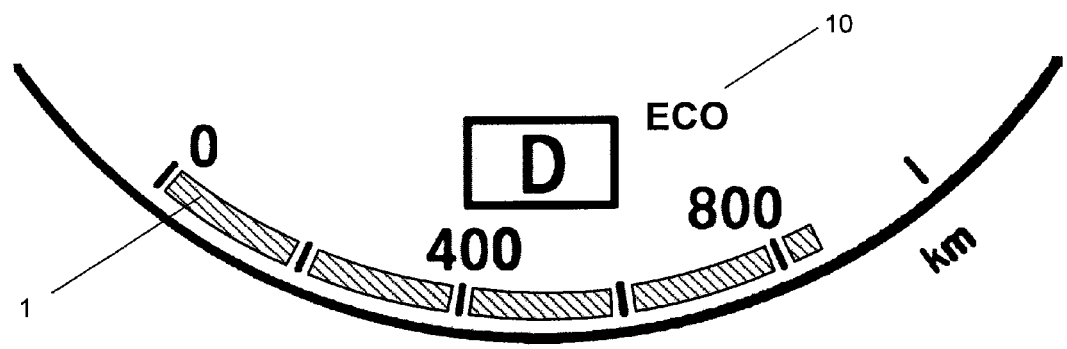
FIG. 2 is a second view of a display device for displaying the remaining range in a motor vehicle.

Step 2 of the sequence relates to the remaining-range display in the ECO driving mode. The predicted increase in the remaining range is displayed in the manner described in the case of. Step 1 only over a defined, basically freely definable period of time (e.g., based on the validity of the prediction from driving data, environmental data, etc.) after switching over to the ECO mode. Accordingly, the remaining-range display changes to a continuous display for the ECO operating mode (cf. FIG. 2). The bar 1 is now no longer subdivided into two partial bars and also no longer has an arrowhead. The analog remaining-range display in the form of the bar 1 receives a specific color-coding in this mode (here: green, preferably the same shade of green as used previously for the partial bar 1b). FIG. 2 shows the continuous display of the remaining range in the ECO mode.

The lettering 10 continues to be illuminated in green in the situation shown in FIG. 2.

Step 3 of the sequence relates to the display of the decrease in the remaining range resulting from an inefficient driving style starting from the ECO mode.

For this purpose, a graphical element 3 is integrated in the analog remaining-range display (cf. FIG. 3), which graphical element 3 displays a tendency for decrease in the remaining range depending on parameters capable of being influenced by the driver such as driving style (by activating the accelerator pedal and the brake) and a change in convenience functions (e.g., climate setting). The graphical element 3 from FIG. 3 represents a third graphical element within the content of the invention.

An arrowhead with specific color-coding (here: red) and pointing in the direction of decreasing remaining range is selected as the graphical element 3. The bar 1 substantially remains unchanged in terms of its shape. However, the color-coding of the bar 1 is adapted (change from green to neutral gray).

For example, if the driver leaves the selected ECO driving mode temporarily by consciously selected acceleration, the motor vehicle automatically switches over to the ECO-OVERRULE mode, and the inefficient driving style of the driver and the resulting decrease in remaining range is indicated by a fading-in of the graphical element 3. FIG. 3 shows the display of the display device in the case of inefficient driving; that is to say, during the temporary exit from the ECO mode and the transition into the ECO-OVERRULE mode.

Figure 3:
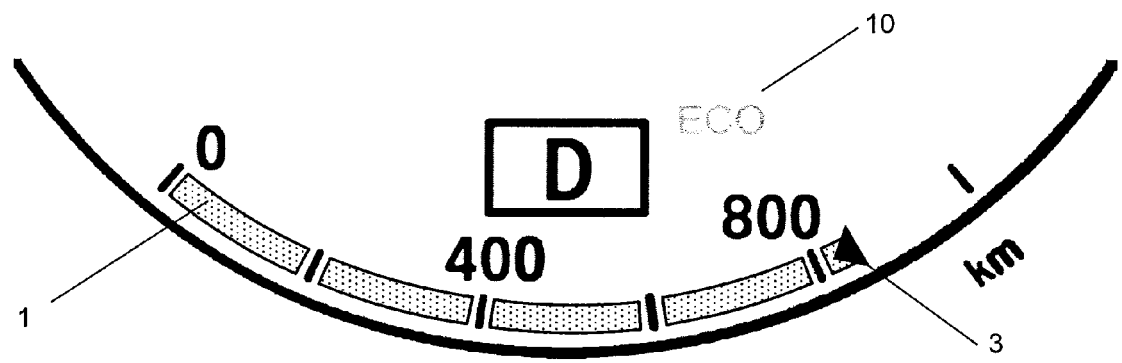
FIG. 3 is a third view of a display device for displaying the remaining range in a motor vehicle.

The lettering 10 is now no longer illuminated in green in the situation shown in FIG. 3, but instead appears in restrained gray. This likewise indicates to the driver that a transition has been made from the ECO mode into the ECO-OVERRULE mode. If the driver retains an inefficient driving style for a longer period of time, the decrease in remaining range is displayed by a "movement" of the graphical element.

This display occurs in two steps. In a first step shown in FIG. 4, the arrowhead 3 disappears (that is to say, the arrowhead 3 shown in FIG. 3 is faded out) and an arrowhead 2 is faded in apart from the initially unchanged bar 1 as a prediction of a reduced remaining range. The arrowhead 2 from FIG. 4 represents a second graphical element within the content of the invention.

Figure 4:
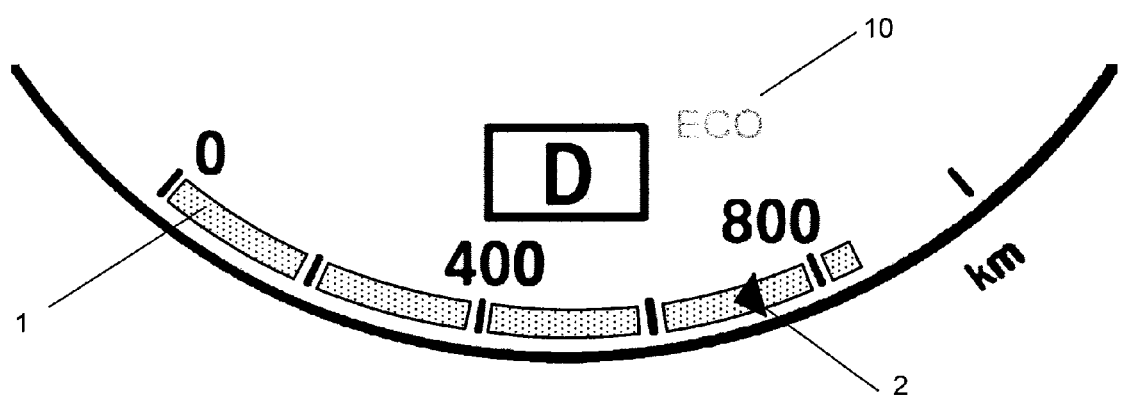
FIG. 4 is a fourth view of a display device for displaying the remaining range in a motor vehicle.

In the transition from FIG. 3 to FIG. 4, the image appearing to the observer is that of one and the same arrowhead moving from the end of the bar toward a reduced remaining-range value (here, at approximately 720 km).

The lettering 10 continues to appear in restrained gray in the situation shown in FIG. 4. It continues to indicate to the driver that he is in the ECO-OVERRULE mode.

Figure 5:
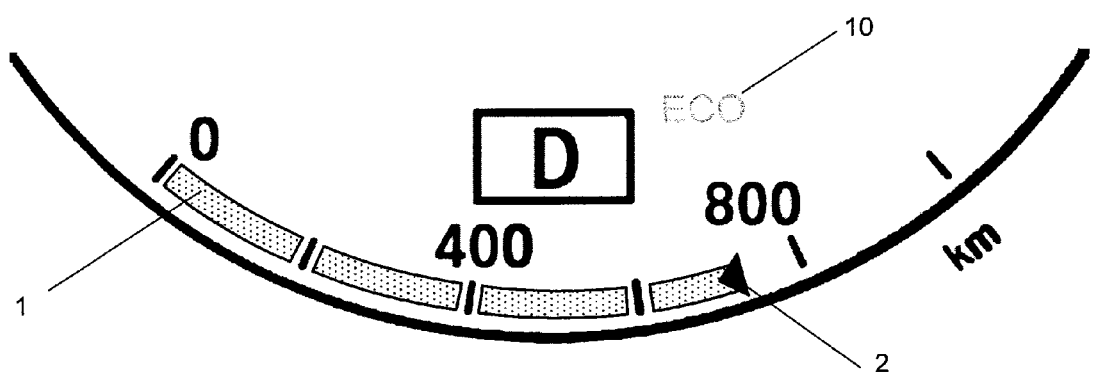
FIG. 5 is a fifth view of a display device for displaying the remaining range in a motor vehicle.

If the inefficient driving style is retained, a second step shown in FIG. 5 follows after a predetermined period of time. The bar 1 for indicating the remaining range reduces to the value highlighted previously by the arrowhead 2. The arrowhead 2 continues to be faded in. It indicates to the driver that the remaining range is limited by an overruling of the ECO mode and the transition into the ECO-OVERRULE mode and that the remaining range would turn out to be higher in the ECO mode.

The lettering 10 continues to appear in restrained gray in the situation shown in FIG. 5. This continues to indicate to the driver that he is in the ECO-OVERRULE mode.

Figure 6:
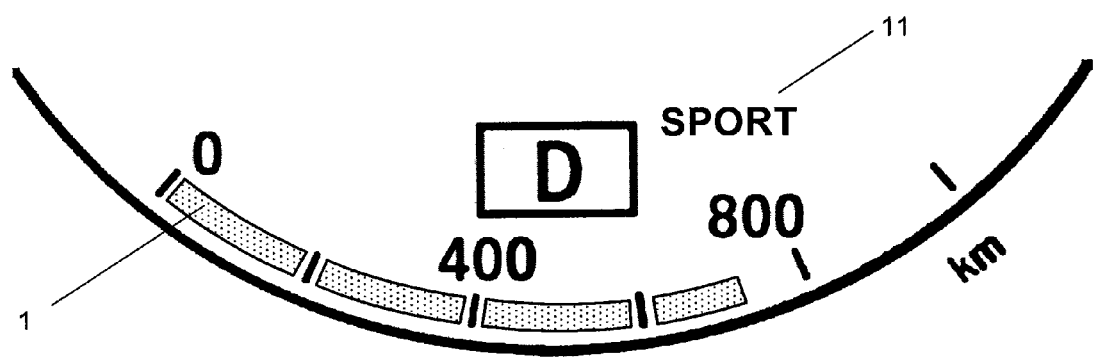
FIG. 6 is a sixth view of a display device for displaying the remaining range in a motor vehicle.

In Step 4 of the process, the display of the remaining range relates to the SPORT mode. If the driver leaves the ECO mode by changing the driving mode, the display of the remaining range can be faded out completely depending on the space required by the display area available, or the display of the remaining range is shown by the bar 1 alone without the graphical elements 2, 3, 4 described above (cf. FIG. 6). FIG. 6 thus shows a display of the remaining range without displaying consumption tendencies (here, in the selected SPORT mode).

Instead of the lettering 10, a lettering 11 "SPORT" appears in the SPORT mode; that is to say, in the situation shown in FIG. 6. This indicates to the driver that he is driving in the SPORT mode.

Since the display of the remaining range with integrated consumption tendency can be changed continuously at short notice by the driver's operations, the display is preferably shown in the instrument panel of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for displaying a remaining range of a motor vehicle using an information device of the motor vehicle including a device for determining a fill level of an energy storage unit of the vehicle, a computer for determining estimated values relating to the remaining range, and a graphical display device for displaying the remaining range, the method comprising the acts of:

repeatedly determining estimated values relating to the remaining range of the motor vehicle based on the fill level of the energy storage unit and at least one additional state of the motor vehicle that influences the remaining range;

determining a first remaining-range value based on the estimated values and displaying the first remaining range value as a first display value by a first graphical element on the display device;

determining an updated second remaining-range value during the display of the first display value;

determining a difference in terms of amount between the first remaining-range value and the updated second remaining range value;
if the difference exceeds a predetermined threshold value, displaying the second remaining-range value as a second display value by a second graphical element in addition to the first display value on the display device;
determining an updated third remaining range value during the display of the first display value and the second display value; and
if the updated third remaining-range value is closer to the second remaining-range value than to the first remaining-range value, accepting the second remaining-range value as the first display value and displaying the second remaining-range value by the first graphical element.

2. The method according to claim 1,
wherein the second graphical element remains faded-in on the display device.

3. The method according to claim 1,
wherein the second graphical element is faded out on the display device.

4. The method according to claim 1, wherein the first graphical element is a bar.

5. The method according to claim 4, wherein the second graphical element is an arrowhead.

6. A method for displaying a remaining range of a motor vehicle using an information device of the motor vehicle including a device for determining a fill level of an energy storage unit of the vehicle, a computer for determining estimated values relating to the remaining range, and a graphical display device for displaying the remaining range, the method comprising the acts of:
repeatedly determining estimated values relating to the remaining range of the motor vehicle based on the fill level of the energy storage unit and at least one additional state of the motor vehicle that influences the remaining range;
determining a first remaining-range value based on the estimated values and displaying the first remaining range value as a first display value by a first graphical element on the display device;
determining an updated second remaining-range value during the display of the first display value;
determining a difference in terms of amount between the first remaining-range value and the updated second remaining range value;
if the difference exceeds a predetermined threshold value, displaying the second remaining-range value as a second display value by a second graphical element in addition to the first display value on the display device;
during the display of the first display value and before the display of the second display value, monitoring a change of the at least one additional state of the motor vehicle that influences the remaining range; and
if a remaining-range change in terms of amount resulting from the change of the state of the motor vehicle exceeds a predetermined change threshold value, displaying a third graphical element representing the remaining-range change in addition to the first display value.

7. The method according to claim 6, wherein the third graphical element representing the change provides a qualitative display of a decrease or increase in the remaining range.

8. The method according to claim 6, wherein the display of the third graphical element occurs along with a color change of the first graphical element.

9. The method according to claim 6, wherein:
delaying-in-time the determination of the second remaining-range value in relation to the display of the third graphical element, said third graphical element having substantially the same appearance as the second graphical element and being substantially faded-out on the display device at the same time as a fade-in of the second graphical element.

10. The method according to claim 6, wherein at least one of the second and third graphical elements are displayed only in one of several operating modes of the motor vehicle.

11. The method according to claim 10, wherein a change in the remaining range of the motor vehicle is displayed on the display device by a fourth graphical element in a case of a transition into said one operating mode of the motor vehicle.

12. The method according to claim 10, wherein a change in the remaining range of the motor vehicle is displayed on the display device by a fourth graphical element in a case of a transition into an operating mode proceeding said one operating mode of the motor vehicle.

13. The method according to claim 11, wherein the fourth graphical element is an arrowhead.

14. The method according to claim 11, wherein the fourth graphical element is displayed along with a color change of the first graphical element.

15. A method for displaying a remaining range of a motor vehicle on a display device, the method comprising the acts of:
repeatedly determining estimated values indicative of a remaining-range of the motor vehicle as a function of a consumable quantity stored in the vehicle and an additional state of the motor vehicle that influences the remaining-range;
displaying a first graphical element on the display device, the first graphical element being indicative of a first remaining-range value determined based on the estimated values;
during the display of the first graphical element, determining an updated second remaining-range value;
if a difference in terms of amount between the first and the second remaining-range values exceeds a predetermined threshold value, displaying a second graphical element in addition to the first graphical element, the second graphical element being indicative of the second remaining range value;
determining an updated third remaining-range value while displaying the first and second graphical elements; and
if the third remaining-range value is closer to the second remaining-range value than to the first remaining-range value, displaying the second remaining-range value through the first graphical element.

16. The method according to claim 15, further comprising keeping the second graphical element faded-in on the display device.

17. The method according to claim 15, further comprising keeping the second graphical element faded-out on the display device.

18. A method for displaying a remaining range of a motor vehicle on a display device, the method comprising the acts of:
repeatedly determining estimated values indicative of a remaining-range of the motor vehicle as a function of a consumable quantity stored in the vehicle and an additional state of the motor vehicle that influences the remaining-range;

displaying a first graphical element on the display device, the first graphical element being indicative of a first remaining-range value determined based on the estimated values;

during the display of the first graphical element, determining an updated second remaining-range value;

if a difference in terms of amount between the first and the second remaining-range values exceeds a predetermined threshold value, displaying a second graphical element in addition to the first graphical element, the second graphical element being indicative of the second remaining range value;

monitoring for a change of the additional state of the motor vehicle during the display of the first and second graphical elements; and if a remaining-range change resulting from the monitored change of the state of the motor vehicle exceeds a predetermined change threshold value, displaying a third graphical element indicative of the remaining-range change in addition to the first graphical element.

* * * * *